Oct. 13, 1959   G. K. HAUSE   2,908,190
TRANSMISSION
Filed Oct. 7, 1957
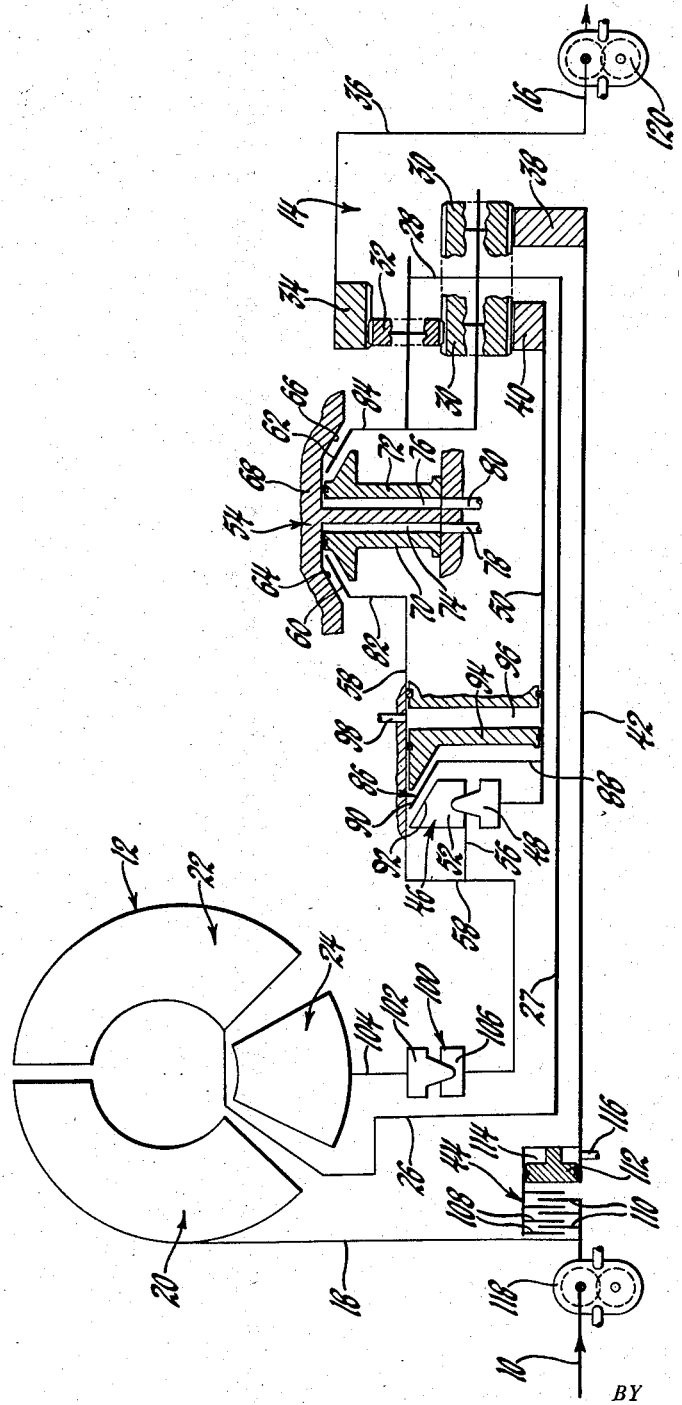
INVENTOR.
Gilbert K. Hause
BY
W. C. Middleton
ATTORNEY United States Patent Office 2,908,190
Patented Oct. 13, 1959

2,908,190

TRANSMISSION

Gilbert K. Hause, Franklin, Mich., assignor to General Motors Corporation, Detroit, Mich., a corporation of Delaware Application October 7, 1957, Serial No. 688,631

19 Claims. (Cl. 74—688)

This invention relates to an automatic transmission.

An object of this invention is to provide an automatic transmission that is economical to manufacture and simple and compact in design.

A further object of this invention is to provide an automatic transmission employing the use of a torque converter combined with planetary gearing to provide a plurality of forward speed ratios, neutral and a reverse ratio.

A further object of this invention is to provide a transmission having a hydrodynamic drive device comprising a pump and two turbines, one of said turbines being held stationary at times to act as a reaction member and at other times being rotated rearwardly in relation to the direction of rotation of the pump to drive the transmission in reverse.

A further object of this invention is to provide an automatic transmission having a torque converter with a normally forwardly rotating turbine for providing a forward drive ratio, with a brake member on said turbine to hold said turbine to provide a reverse drive ratio by driving the stator or reaction member in a reverse direction.

A still further object of this invention is to provide an automatic transmission having a torque converter combined with planetary gearing, with clutch means for connecting a drive shaft to the gearing in parallel with the connection through the torque converter, thereby providing split-torque power flow from the input to the output shaft.

Other features, advantages and objects will become apparent by reference to the detailed description of the invention and to the drawing wherein:

The figure shows a schematic illustration of a transmission embodying this invention.

Referring to the figure, there is shown therein an input or drive shaft 10 adapted to drive a torque converter 12 in turn driving a compound planetary gear set 14 to rotate the output shaft 16.

Referring now more in detail to the drawing, the input or drive shaft 10, which may be driven by any suitable means (not shown) has an extension flange 18 connected to drive the rotatable pump 20 of a conventional torque converter 12 having a normally forwardly rotating turbine 22 and a turbo-stator or reaction member 24. The blades of the turbine and stator are shaped in the conventional manner so that at low forward speeds of the pump, the fluid leaving the forwardly rotating turbine will strike the stator blades in a manner to attempt to rotate it in a direction opposite to the direction of rotation of the pump, while at higher pump speeds, the fluid leaving the turbine will strike the stator blades at a more favorable angle to rotate the stator in the same direction as that of the pump.

Connected to turbine 22 by means of a drive connection 26 and a sleeve shaft 27 is the rotatable carrier 28 of the gear set 14, the carrier rotatably supporting a plurality of relatively long pinions 30 meshing with a plurality of relatively short pinions 32, pinions 32 in turn meshing with a ring gear 34 connected to output shaft 16 by drive connection 36.

Meshing with the long pinions 30 are a plurality of sun gears 38 and 40 having the same number of teeth, sun gear 38 being attached to a shaft 42 connected to input shaft 10 by means of a fluid pressure actuated clutch mechanism 44, which will be described hereinafter.

Sun gear 40 is controlled in its rotation by a one-way device 46 having one race 48 connected by a sleeve shaft 50 to sun gear 40, with the other race 52 connected to a brake mechanism 54 by means of connections 56 and 58.

Brake assembly 54 comprises cone brake elements 60 and 62 adapted to be engaged with cooperating brake elements 64 and 66, respectively, formed as a part of the stationary casing 68. The brake elements 60 and 62 are adapted to be engaged alternately by means of two oppositely acting pistons 70 and 72 positioned on opposite sides of the housing 68 and moved into engaging position by means of fluid in chambers 74 and 76, respectively, supplied through suitable conduits 78 and 80. The brake element 60 is formed as an extension 82 of connection 58, while brake element 62 is formed on an extension 84 of the carrier 28 of gear set 14.

With brake 60 engaged, one-way device 46 engages upon reverse rotation of sun gear 40 to prevent the same, while permitting overrun of the sun gear with respect to the race 52 in a forward direction. With brake 60 disengaged and race 52 being driven reversely, one-way device 46 disengages and sun gear 40 will idle. To prevent idling when it is desired to drive sun gear 40 reversely such as in reverse drive ratio or to prevent forward rotation of sun gear 40 upon coast of the vehicle, a cone clutch 86 is provided attached at 88 to sun gear sleeve shaft 50 and having a friction surface 90 adapted to be engaged with a friction surface 92 on the race 52, thereby connecting the sleeve shafts 50 and 58, by-passing the one-way device 46 and rendering it inoperative. Clutch 86 may be engaged by any suitable means such as a piston 94 actuated by pressure in a chamber 96 supplied with fluid through a conduit 98, and released by means of a suitable spring (not shown).

As seen in the figure, the turbo-stator 24 is adapted to be connected to the race 52 of one-way device 46 and the cone brake element 60 by means of a one-way engaging means 100, having one race 102 connected to the turbo-stator 24 by connection 104 with the other race 106 connected to connection 58. With brake 60 engaged, one-way device 100 thus acts to prevent reverse rotation of turbo-stator 24, while permitting overrun of the turbo-stator in a forward direction. With brake 60 released, reverse rotation of turbo-stator 24 will engage the one-way device 100 to drive connection 58 and race 52 of one-way device 46 rearwardly.

As mentioned previously, sun gear 38 is adapted to be connected to drive shaft 18 and pump 20 by means of a clutch 44. This clutch comprises a plurality of friction plates 110 splined to extension 18 of drive shaft 10 and cooperating with a plurality of friction plates 108 splined to shaft 42. The clutch is engaged by a piston 112 actuated by fluid pressure in a chamber 114 supplied with fluid through a suitable conduit 116, and disengaged by a spring (not shown).

Two fluid pumps 118 and 120 are shown connected to the drive and driven shafts 10 and 16, respectively, for supplying the necessary fluid pressure for actuation of the brake and clutch elements.

OPERATION

*Neutral*

With the engine idling or at rest, no fluid is supplied to the brakes 60, 62 or clutches 86 and 44, thereby causing forward rotation of pump 20 to rotate the gear set 14 idly without transmitting any torque to the output shaft 16, since no reaction member is provided in the gear set. Thus the drive is interrupted between the drive shaft 10 and output shaft 16 and a neutral condition of the transmission is provided.

*Forward*

With the engine idling and upon supplying fluid to the conduit 78 to engage cone brake element 60, rotation of the pump 20 in a forward direction will rotate turbine 22 forwardly to attempt to rotate the turbo-stator 24 in a reverse direction, such reverse rotation of the turbo-stator being prevented by engagement of the one-way device 100, the race 106 of which is held stationary by its connection 58 to the cone brake 60. Torque conversion therefore takes place in the torque converter 12 with the turbine 22 driving the carrier 28 of gear set 14 forwardly. Since the ring gear 34 is connected to the load on the output shaft 16, this gear acts temporarily as a reaction member. Therefore, upon forward rotation of carrier 28, the short pinions 32 will attempt to rotate counterclockwise rotating long pinions 30 clockwise to attempt to rotate sun gear 40 counterclockwise, such counterclockwise rotation of the sun gear being prevented by the engagement of one-way device 46, the race 52 of which is held stationary by the cone brake 60. Therefore, the sun gear 40 becomes the main reaction member and forward rotation of carrier 28 will rotate ring gear 34 forwardly through the intermeshing planet pinions 30 and 32 to drive output shaft 16 forwardly and at a speed lower than the speed of drive shaft 10.

Upon increased rotational speeds of pump 20, turbine 22 will rotate faster such that the fluid leaving the turbine blades will strike the back of the turbo-stator blades 24 to cause forward rotation of this turbo-stator, this forward rotation being permitted by overrun or disengagement of the one-way device 100. The torque converter 12 then begins to function as a hydraulic coupling without torque conversion.

At this time, the clutch 44 may be engaged by fluid pressure through line or conduit 116 thereby connecting the drive shaft 10 to sun gear 38 to drive the same at engine speed. A split torque drive is then established to the gear set 14, one power path being from drive shaft 10 to sun gear 38 through clutch 44, with the other power path being through the torque converter 12 and the carrier 28. At this time, sun gear 38 and therefore sun gear 40 will be driven forwardly or clockwise at engine speed to drive the long pinions 30 counterclockwise which in turn drive short pinions 32 clockwise to cause ring gear 34 to be driven forwardly at a speed greater than the speed at which the ring gear is driven with clutch 44 disengaged, the forward rotation of sun gear 40 being permitted by the disengagement of one-way device 46. The ring gear 34 will thus drive the output shaft 16 through the connection 36 at an increased speed approaching a direct ratio, the differential between the speed of the drive shaft 10 and driven shaft 16 being caused by the inherent slip in the torque converter 12.

*Hill brake or positive low*

Upon coasting of the vehicle forwardly, as for instance, upon descending a hill, with release of the accelerator pedal by the operator, the output shaft 16 becomes the driver, with the carrier 28 being the follower. At this time, ring gear 34 will cause sun gear 40 to be rotated forwardly, which is permitted by the disengagement of one-way device 46. Therefore, the gear set 14 would merely idle without a reaction member being provided, and no braking effect would be provided. To obviate this, the operator may cause engagement of clutch 86 to connect sun gear 40 with brake 60 to hold the sun gear stationary in both directions of rotation. Thereafter, coasting of the vehicle will produce a drive with ring gear 34 driving the carrier 28 to attempt to drive the turbine 22 faster than it is being driven by pump 20, such faster turbine rotation being retarded by the fluid flow in the torque converter. Thus, an effective braking is accomplished to retard forward coast of the vehicle.

*Reverse*

Upon engagement of brake 62 by admission of fluid to chamber 76 through conduit 80 to move piston 72, and upon engagement of clutch 86 by movement of piston 94 by fluid in chamber 96 to connect sun gear sleeve shaft 50 and stator shaft connection 58, and upon disengagement of clutch 44 and brake 60, turbine 22 and carrier 28 will be held stationary.

Upon forward rotation of input shaft 10 and pump 20, the fluid leaving stationary turbine 22 will cause reverse rotation of turbo-stator 24 thus engaging one-way device 100 thereby driving sun gear 40 rearwardly through connections 106, 56, engaged clutch 86 and sleeve shaft 50. With carrier 28 stationary to act as a reaction member, counterclockwise rotation of sun gear 40 will rotate long pinions 30 clockwise, short pinions 32 counterclockwise to cause ring gear 34 to be driven in a reverse direction to drive output shaft 16 in a direction opposite to the direction of rotation of input shaft 10, thereby providing a reverse reduction drive through the transmission.

From the foregoing it will be seen that this invention provides a transmission having a torque converter combined with a single compound planetary gear set to provide a plurality of forward speeds, neutral and reverse, with the final forward speed being a split torque drive. This invention further provides a torque converter having one member acting at times as a reaction member, while at other times acting as a driving member. It will be understood that the invention can be modified beyond the illustrated embodiment, and therefore, any limitations to be imposed are those set forth in the following claims:

I claim:

1. A transmission comprising a drive shaft, a driven shaft, and means connecting said shafts for providing a plurality of forward speed drives, neutral and reverse, said means including a hydrodynamic drive device and planetary gear means, said hydrodynamic drive device having an impeller and a plurality of turbines, said impeller being connected with said drive shaft, said gear means including a ring gear, a plurality of sun gears, and a plurality of intermeshing pinions meshing with said sun and ring gears, a carrier for said pinions, said ring gear being connected with said driven shaft, said carrier being connected to one of said turbines, brake means for holding one of said sun gears from rotation for establishing a reduction drive through said gear means, and one-way engaging means connecting another of said turbines and said brake means, brake means for holding said one of said turbines from rotation for establishing a reverse drive through said gear means, and clutch means for connecting another of said sun gears and said drive shaft to establish a substantially one-to-one drive from said drive to said driven shafts.

2. A transmission comprising a drive shaft, a driven shaft, and means connecting said shafts for providing a plurality of forward gear ratios, neutral and reverse, said means including a hydrodynamic drive device and planetary gear means, said drive device having a pump and a plurality of turbine members, said pump being connected to said drive shaft, said planetary gear means including a ring gear, a plurality of sun gears, and a plurality of pinions meshing with said ring and sun gears, a carrier for said pinions and having a connection with one of said turbine members, said ring gear being connected with said driven shaft, brake means for preventing rotation of one of said sun gears in one direction of rotation, one-way engaging means connecting another of said turbine members with said brake means, brake means for preventing rotation of said one turbine member, and means for actuating said brake means, rotation of said drive shaft and holding of said one turbine member by said brake means causing said other turbine member to be rotated in a direction opposite to that of the drive shaft to drive said driven shaft in a reverse direction.

3. A transmission comprising a drive shaft, a driven shaft, and means connecting said shafts, said means including a hydrodynamic drive device and planetary gear means, said drive device including a pump and a plurality of turbines, said pump being connected to said drive shaft, said gear means including a ring gear, a sun gear and a plurality of planet pinions meshing with said ring and sun gears, a carrier for said pinions and having a connection with one of said turbines, brake means for preventing rotation of said one turbine, and means for engaging said brake means, clutch means connecting another of said turbines and said sun gear, rotation of said pump with said brake means and said clutch means engaged causing rotation of said other turbine in an opposite direction from the direction of rotation of said pump to rotate said driven shaft in a direction reverse from the direction of rotation of said drive shaft.

4. A transmission comprising a drive shaft, a driven shaft, and means connecting said shafts for providing a plurality of forward speed ratios, neutral and reverse, said means including a hydrodynamic drive device and gear means, said drive device including a pump and a plurality of turbine elements, said gear means including drive, driven and a plurality of rotatable members including a reaction member, said drive member being connected with one of said turbine elements, said driven member being connected with said driven shaft, and brake means for holding said reaction member from rotation to provide a reduction drive through said gear means, means for connecting said pump with another of said rotatable members to provide a different drive, and brake means for said one of said turbine elements, application of said brake means for said reaction member causing forward rotation of said one turbine element to drive said driven shaft in a forward direction upon forward rotation of said drive shaft, application of said brake means for said one turbine element causing rotation of another of said turbine elements in a direction opposite to that of said pump to drive said driven shaft in a direction opposite to that of said drive shaft.

5. A transmission comprising an input shaft, an output shaft, and means connecting said shafts for providing a plurality of forward speed ratios, neutral and reverse, said means including a hydrodynamic drive device and planetary gear means, said drive device having a pump and a plurality of turbine members, said pump being connected to said input shaft, said gear means having a ring gear, a plurality of sun gears, and a plurality of pinions meshing with said ring and sun gears, a carrier for said pinions connected to one of said turbine members, said ring gear being connected to said output shaft for rotation therewith, brake means for holding one of said sun gears from rotation, brake means for holding said carrier from rotation, and fluid pressure actuated means for holding said brake means stationary, rotation of said input shaft upon engagement of said brake means for said sun gear providing a forward reduction drive through said transmission to said output shaft, engagement of said brake means for said carrier with release of said sun gear brake means producing a reverse rotation of said output shaft relative to said input shaft by rotation of another of said turbine members in a direction opposite to the direction of rotation of said pump.

6. A transmission having a drive shaft, a driven shaft and means connecting said shafts, said means including a hydraulic torque converter and planetary gear means, said torque converter having a pump, a turbine and a stator member, said pump being connected to said drive shaft, said gear means including a ring gear, a plurality of sun gears and a plurality of pinions meshing with said ring and sun gears, a carrier for said pinions connected to said turbine, brake means for one of said sun gears to provide a forward drive reaction member in said gear set, and brake means for said carrier to provide a reverse drive reaction member in said gear set, one-way engaging means between said stator member and said sun gear, clutch means connecting said drive shaft to another of said sun gears, and second clutch means connecting said one sun gear and said one-way means, rotation of said drive shaft and engagement of said sun gear brake means effecting engagement of said one-way engaging means to prevent rotation of said stator member and said one sun gear in a first stage of operation, said one-way engaging means being inoperative thereby permitting rotation of said stator member in a second stage of operation, engagement of said first clutch means constituting a third stage of operation of said transmission, engagement of said carrier brake means and said second clutch means with disengagement of said sun gear brake means and said first clutch means effecting engagement of said one-way engaging means by rotation of said stator member in a reverse direction to constitute a fourth stage of operation wherein said driven shaft is rotated in a direction opposite to the direction of rotation of said drive shaft.

7. A transmission having an input shaft, an output shaft and means connecting said shafts, said means including a hydraulic torque converter and planetary gear means, said torque converter comprising a pump, a turbine and a stator member, said gear means including a ring gear, a plurality of sun gears, a plurality of pinions meshing with said ring and sun gears, a carrier for said pinions attached to said turbine, means connecting said output shaft and said ring gear, clutch means connecting said stator member and one of said sun gears, and brake means for said carrier, rotation of said pump with engagement of said brake means and said clutch means causing rotation of said stator member to drive said sun gear in a direction reverse to that of the direction of said pump to drive said output shaft in a direction opposite to the direction of rotation of said input shaft.

8. A transmission having an input shaft, an output shaft and means connecting said shafts, said means including a hydrodynamic drive device and planetary gear means, said drive device comprising a pump and a plurality of turbine members, said pump being connected to said input shaft, said gear means including a ring gear, a plurality of sun gears, a plurality of pinions meshing with said ring and sun gears, a carrier for said pinions attached to one of said turbine members, said ring gear being connected to said output shaft, brake means, one-way engaging means connecting another of said turbine members with said brake means, second one-way engaging means connecting one of said sun gears with said brake means, and clutch means connecting another of said sun gears and said input shaft, rotation of said input shaft with engagement of said brake means providing one forward reduction drive through said transmission to said output shaft, release of said first one-way engaging means upon increased rotation of said output shaft providing a second forward reduction drive through said transmission, and engagement of said clutch means providing a third forward drive through said transmission.

9. A transmission comprising a drive shaft, a driven shaft, and means for connecting said shafts, said means including a hydrodynamic drive device and planetary gear means, said drive device comprising a plurality of rotatable members, said gear means including drive, driven and a plurality of reaction elements, means connecting said drive element and one of said rotatable members, releasable one-way brake means for one of said reaction elements, and clutch means connecting another of said rotatable members and another of said reaction elements, release of said brake means and engagement of said clutch means upon rotation of said rotatable members in a forward direction providing one forward drive through said transmission.

10. A transmission as in claim 9, wherein there is provided means for connecting a third rotatable member with said brake means.

11. A transmission comprising, a drive shaft, a driven shaft, and means for connecting said shafts, said means including a hydrodynamic drive device and planetary gear means, said drive device comprising a rotatable pump and a plurality of rotatable turbines, said pump being connected to said drive shaft, said gear means comprising drive, driven and a plurality of reaction elements, means connecting said drive element and one of said turbines, means connecting said driven element and said driven shaft, brake means, means connecting another of said turbines and one of said reaction elements to said brake means, means connecting another of said reaction elements and said pump, application of said brake means upon forward rotation of said one turbine providing one forward drive through said transmission, connection of said pump and other reaction member providing a second forward drive through said transmission.

12. A transmission comprising a drive shaft, a driven shaft and means connecting said shafts, said means including a hydrodynamic drive device and gear means, said drive device comprising a plurality of rotatable members, means connecting one of said members and said drive shaft, said gear means comprising a plurality of rotatable elements, means connecting a second rotatable member and one rotatable element of said gear means, means connecting said one rotatable member and a second rotatable element, means connecting a third rotatable element and said driven shaft, means connecting a third rotatable member and a fourth rotatable element, and brake means for at times holding said third member and fourth element stationary, application of said brake means upon forward rotation of some of said rotatable members causing a forward drive through said transmission.

13. A gear set comprising drive, driven, and a plurality of rotatable members including a reaction member, a plurality of input shafts, an output shaft, means connecting one input shaft and said drive member, means connecting said driven member and said output shaft, brake means for said reaction member, engagement of said brake means providing one forward drive ratio through said transmission, clutch means connecting another of said rotatable members to another of said input shafts, engagement of said clutch means providing a different forward speed ratio drive through said transmission, means connecting a further input shaft to said reaction member, brake means for said one input shaft, the application of said one input shaft brake means and release of said reaction member brake means and clutch means effecting a reverse rotation of said reaction member and driven shaft upon forward rotation of said other input shaft.

14. A gear set comprising a pluralty of drive shafts, a driven shaft and means connecting said shafts, said means comprising a ring gear, a plurality of sun gears, a plurality of intermeshing planet pinions meshing with said sun and ring gears, and a carrier rotatably supporting said pinions, means connecting one of said drive shafts and said carrier, means connecting said ring gear and said output shaft, means connecting another of said drive shafts and one of said sun gears, the simultaneous driving of said drive shafts providing a forward drive through said transmission, means connecting a further drive shaft to another of said sun gears, brake means for said one drive shaft, application of said brake means and rotation of said remaining shafts effecting a reverse drive to said driven shaft.

15. A transmission comprising a drive shaft, a driven shaft and means connecting said shafts, said means including a hydrodynamic drive device and planetary gear means, said drive device including a rotatable pump connected to said drive shaft and a plurality of rotatable turbines, said gear means including a ring gear, a plurality of sun gears, a plurality of pinions meshing with said sun and ring gears and a carrier rotatably supporting said pinions, said ring gear being connected to said driven shaft, means connecting one of said turbines and said carrier, brake means for said turbine, and clutch means connecting another of said turbines and one of said sun gears, application of said brake means and said clutch means upon forward rotation of said pump causing reverse rotation of said output shaft.

16. A transmission as in claim 15, wherein said clutch means includes releasable one-way engaging means.

17. A transmission comprising a drive shaft, a driven shaft and means connecting said shafts, said means including a hydrodynamic drive device and planetary gear means, said drive device comprising a hydraulic torque converter having pump, turbine and stator members, means connecting said pump to said drive shaft, said gear means including drive, driven and a plurality of reaction members, means connecting said turbine and said drive member, means connecting said driven member and said driven shaft, means connecting said stator member and one of said reaction members, and clutch means for connecting another of said reaction members and said pump, said stator member connecting means comprising a plurality of releasable one-way engaging devices, brake means for said latter connecting means, engagement of said brake means upon forward rotation of said pump causing forward rotation of said turbine with said stator member being held stationary to provide one forward drive through said transmission, engagement of said clutch means providing another forward drive through said transmission, said second forward drive providing a split torque power path from said drive input shaft to said driven shaft.

18. In a transmission, the combination of an input, an output, a hydrodynamic torque transmitting mechanism including an impeller revolvable with the input and a plurality of turbines, a planetary gear set having a primary driving element revolvable with one of the turbines, a secondary driving element, a reaction element, and a driven element adapted to be connected to the output, forward brake means for preventing reverse rotation of another of the turbines and the reaction element so as to condition both the torque transmitting mechanism and the gear set for low speed forward drive, clutch means interposed between the input and the secondary driving element operative to cause the gear set to be conditioned for a relatively high speed forward drive with both the primary and secondary driving elements supplying drive thereto, a one-way device between the forward brake means and the reaction element arranged to allow free forward rotation thereof when the clutch means is operative, and reverse brake means for preventing rotation of said one of the torque transmitting mechanism turbines, said another of the torque transmitting mechanism turbines being constructed and arranged to revolve the reaction element backwards with the forward brake means and the clutch means released, and the reverse brake means operative and thereby establish reverse drive.

19. In a transmission, the combination of an input, an output, a hydrodynamic torque transmitting mechanism including an impeller revolvable with the input and a plurality of turbines, a planetary gear set having a primary driving element revolvable with one of the turbines, a secondary driving element, a reaction element and a driven element adapted to be connected to the output, forward brake means for preventing reverse rotation of another of the turbines and the reaction element so as to condition both the torque transmitting mechanism and the gear set for low speed forward drive, first clutch means interposed between the input and the secondary driving element operative to cause the gear set to be conditioned for a relatively high speed forward drive with both the primary and secondary driving elements supplying drive thereto, a one-way device between the forward brake means and the reaction element arranged to allow free forward rotation thereof when the first clutch means is operative, reverse brake means for preventing rotation of said one of the torque transmitting mechanism turbines, said another of the torque transmitting mechanism turbines being constructed to be revolved backwards with the forward brake means and first clutch means released and the reverse brake means operative and thereby establish reverse drive.

References Cited in the file of this patent

UNITED STATES PATENTS

| | | |
|---|---|---|
| 2,549,125 | Paton | Apr. 17, 1951 |
| 2,578,450 | Pollard | Dec. 11, 1951 |
| 2,695,533 | Pollard | Nov. 30, 1954 |
| 2,725,762 | Hettinger et al. | Dec. 6, 1955 |